Aug. 26, 1952      C. J. STRAKA      2,608,499

HEAT-TREATED GLASS FABRIC

Filed Sept. 12, 1946

WITNESSES:

INVENTOR
Cyril J. Straka.
BY Frederick Shapoe
ATTORNEY

Patented Aug. 26, 1952

2,608,499

UNITED STATES PATENT OFFICE 2,608,499

HEAT TREATED GLASS FABRIC

Cyril J. Straka, Wilkinsburg, Pa., assignor to Westinghouse Electric Corporation, East Pittsburgh, Pa., a corporation of Pennsylvania Application September 12, 1946, Serial No. 696,597

5 Claims. (Cl. 154—43)

This invention relates to composite members embodying glass fiber material and organo-silicon oxide resins applied thereto.

In manufacturing glass fiber materials, it has been found necessary to apply organic lubricants, such as oils or starch, in an amount of 1% or less of the glass material to the glass filaments as they are drawn out. A great number of filaments, usually 102, are combined to form a glass fiber or thread and the presence of a lubricant is necessary in order to prevent the filaments from cutting one another and to permit relative motion of the filaments as the fibers are bent and distorted during subsequent processing. The glass filaments are highly abrasive and relatively adherent to one another so that without the lubricant the threads could not be successfully spun and woven. A relatively small amount of oil, starch or the like organic hydrocarbon-oxygen compound is present, but substantially the entire surface of the glass filaments is covered with a thin layer of the organic material.

It is highly desirable to combine glass fiber material with organo-silicon oxide resins in order to secure members capable of use at elevated temperatures while having good tensile strength and other physical and electrical properties. It has been discovered, however, that due to the presence of the organic lubricants on the glass materials that the bonding of the organo-silicon oxide resins to the glass is relatively unsatisfactory. The presence of an intermediate layer of the starch or oil further results in poor dielectric strength, low moisture resistance and other deficiencies in a composite material prepared from the glass materials and the organo-silicon oxide resins.

While it has been proposed to subject woven glass cloth or other glass fiber material to temperatures sufficient to burn off the organic lubricant on the glass, previous to applying resins thereto, it has been found that the improvement so produced is meager and certain undesirable features result. For example, the bond strength of the organo-silicon oxide resin to the glass fibers is low when applied to heat treated glass fiber material.

The object of this invention is to provide for heat treating glass fiber material carrying an organic lubricant and a superimposed coating of a fluid phenyl methyl siloxane or a fluid siloxane composed of phenyl methyl siloxane admixed with other organo-silicon oxides, at a temperature and for a time sufficient to volatilize and to carbonize the organic lubricant.

A further object of the invention is to provide a heat treated glass fiber material in which a previously applied organic lubricant has been volatilized and carbonized by heat treatment in the presence of a coating of a fluid phenyl methyl siloxane.

A still further object of the invention is to provide composite material composed of a phenyl methyl siloxane and a glass fiber material derived by applying a minor amount of phenyl methyl siloxane to glass fiber material containing an organic lubricant and heat treating the coated glass fiber material to volatilize and carbonize the organic lubricant.

Other objects of the invention will in part be obvious and will in part appear hereinafter. For a fuller understanding of the nature and objects of the invention, reference should be had to the following detailed description and drawing, in which.

It has been discovered that several unexpected advantages occur when a glass fiber material, such as glass cloth, glass braid, knitted glass fabrics and the like, carrying an organic lubricant applied during the process of previous manufacture and then coated with a fluid phenyl methyl siloxane in an amount equal to from about 5% to 15% of the weight of the glass fiber material, is burned or heat treated at a temperature and for a sufficient period of time to volatilize and carbonize the organic lubricant. The glass material so produced may be used directly or the heat treated glass fiber material carrying the initial phenyl methyl siloxane coating may be treated with additional polymerizable phenyl methyl siloxane, and members produced therefrom by subjecting the additional siloxane coating on the glass fiber material to polymerizing treatment. The improvement in the composite material produced according to the invention is substantial and results in products having properties not available heretofore.

Figure 1:
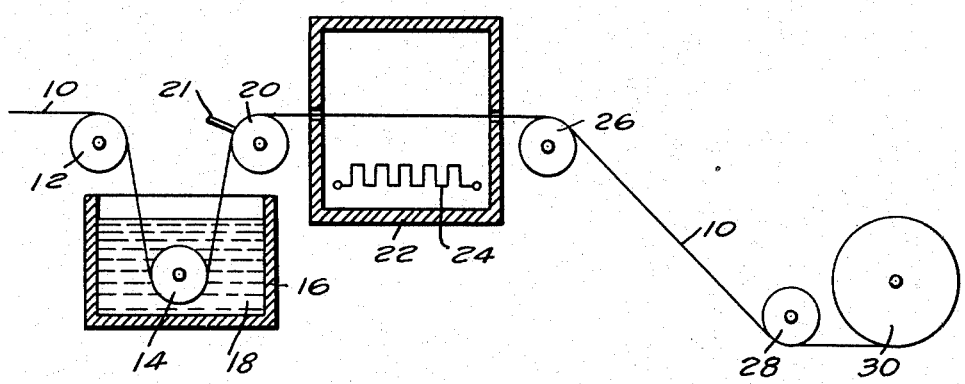
Figure 1 is a schematic view in elevation, partly in section, of an apparatus for heat treating glass fiber material.

Referring to Fig. 1 of the drawing, there is illustrated an apparatus for heat treating glass fiber material in accordance with the invention. Glass fiber material 10, such, for example, as glass cloth coated with an organic lubricant, such as a vegetable oil or starch or the like, passes over rollers 12 and 14 where it is coated in the tank 16 with a fluid phenyl methyl siloxane 18 polymerizable to a solid resinous state. The phenyl methyl siloxane 18 may be a solution composed of a siloxane having various ratios of R to Si and various proportions of the phenyl to methyl groups thereon dissolved in an organic solvent, such as toluene, or it may be a low polymeric phenyl methyl siloxane of a low viscosity. The glass fabric 10 coated with the fluid phenyl methyl siloxane emerges from the bath and passes over a roller 20 cooperating with a doctor blade 21 or other wiping means for maintaining a predetermined amount of the fluid phenyl methyl siloxane on the glass cloth.

In practice it has been found that best results are secured when the amount of phenyl methyl siloxane present in the glass cloth varies from about 5% to 15% of the weight of the glass cloth. A substantially greater amount of the siloxane results in blistering during subsequent heat treatment. If substantially less than 5% of phenyl methyl siloxane is present, the advantages of the invention are not attained.

The siloxane treated glass cloth 10 then passes through an oven 22 provided with a heating element 24 wherein a temperature of from about 300° C. to 450° C., or slightly higher, is maintained in order to volatilize and to carbonize the organic lubricant present on the glass cloth. At 350° C. an exposure of three minutes for two mil glass cloth is sufficient to eliminate the organic lubricant. For higher temperatures the heating interval may be made proportionately shorter. The time of heat-treatment may be somewhat longer but should not be so long as to decompose to any substantial degree the siloxane. The fluid phenyl methyl siloxane cures during the heat treatment to a tack-free solid resinous state. Obviously a gas burner or other suitable source of heat may be employed in the oven 22. The glass cloth will be found to be much smoother after the heat treatment. Thereafter, the glass cloth passes over guide rolls 26 and 28 and may be wound up into a roll 30 for a subsequent use.

For coating the glass fiber material prior to heat treatment, any of a variety of phenyl methyl siloxanes has been found satisfactory. For example, a phenyl methyl siloxane having a ratio of R to Si of 2 wherein one-third of the R's are phenyl groups gave excellent results. The viscosity of different fluids of this class used with success varied in viscosity from 50 to 75 centistokes. In another case a phenyl methyl siloxane having R to Si ratio of 1.5 and having a substantially equal number of phenyl and methyl groups was employed successfully. In still another case the phenyl methyl siloxane had an R to Si ratio of 1.2 and containing a substantially equal number of phenyl and methyl groups was applied to the glass cloth with similarly satisfactory results. On the other hand, the use of dimethyl siloxane did not produce satisfactory results on heat treatment. It is believed that during the heat treatment, the phenyl methyl siloxane undergoes some chemical and physical changes concurrently with the carbonization and volatilization of organic lubricant whereby the phenyl methyl siloxane penetrates into the interstices of each fiber and furthermore adheres to each glass filament in a manner not obtainable if it were applied after heat treatment.

For some applications the heat treated glass material carrying from about 5% to 15% of its weight of phenyl methyl siloxane may be used without additional treatment. The pores and interstices of the cloth will be filled sufficiently to warrant use of the material as insulating tape or cloth.

The heat treated glass fiber material may be coated with additional phenyl methyl siloxane, either similar to that originally applied or different therefrom, capable of being polymerized to a resinous state. The amount and kind of additional phenyl methyl siloxane applied will depend upon the requirements for the resulting composite material. For producing sheet material for electrical insulating applications, for instance, as slot cell liners and conductor wrapping, from 20% to 50% by weight or more of phenyl methyl siloxane may be applied to the heat treated glass fiber material. This amount of phenyl methyl siloxane is not only sufficient to completely impregnate the glass fiber sheet and produce a pore-free, smooth surfaced, product but will provide a surface coating imparting more rigidity.

Glass cloth of two mil thickness treated with 10% by weight of a fluid phenyl methyl siloxane having an R to Si ratio of 1.5 and containing a substantially equal number of phenyl and methyl groups was heat treated for three minutes at 380° C. The material was then coated to apply thereto an additional quantity of the same siloxane equal to 30 to 35% of the weight of the heat treated glass cloth. The coated glass fiber material was then cured at a temperature of 350° C. until the siloxane had been converted to a solid resin. Glass cloth of a similar kind but heat treated without an initial coating of any phenyl methyl siloxane was coated to provide similar total weight of phenyl methyl siloxane under the same heat treating conditions. Tests indicated the following improvement of the former as compared to the latter:

*Table I*

| Type of Glass Fabric | Heat-treated without Siloxane | Coated with Siloxane and then heat-treated |
| --- | --- | --- |
| Dielectric Strength (volts per mil)— Short Time Method: | | |
| ¼″ Dia. Electrodes | 1,875 | 2,705 |
| 2″ Dia. Electrodes | 1,195 | 1,640 |
| Condition of treated material | Rough | Smooth |

It will be apparent from the table that an improvement in dielectric strength of approximately 50% was obtained by employing glass fiber material precoated with the siloxane before heat treatment as compared to the heat treated uncoated glass fiber material. Furthermore, the condition of the treated material of this invention was quite smooth without rough spots or pimples or other objectionable features present in the latter material.

Figure 2:
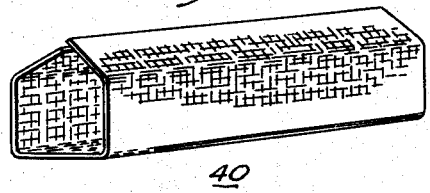
Fig. 2 is a view in perspective of a slot cell liner.

Referring to Fig. 2 of the drawings, there is illustrated a slot cell liner 40 produced from glass fiber cloth heat treated in accordance with the present invention and then coated with sufficient additional phenyl methyl siloxane to produce an impervious smooth sheet. The slot cell liner 40 not only permits the winding of a motor to be accomplished more easily due to its smoothness and a higher space factor than possible with previous materials, but it also possesses better electrical characteristics as compared to material lacking a precoating of siloxane before heat treatment.

The heat treated glass fiber sheet material of this invention may be coated a number of times with a phenyl methyl siloxane with curing of the siloxane between successive applications. Thus, in one case three mil glass fiber sheet initially coated with a phenyl methyl siloxane and heat treated to remove the organic lubricant was coated three times in a toluene solution of a phenyl methyl siloxane having an R to Si ratio of 1.2, the phenyl and methyl groups being substantially equal in number and the toluene solution containing approximately 40% siloxane solids. After three applications of the phenyl methyl siloxane with heat treatment after each successive application at a temperature of from 320 to 380° C. for three minutes, the thickness of the sheet was approximately seven mils. This sheet was fairly rigid and was capable of use as a support, a slot cell liner or in other applications requiring a relatively rigid insulating member.

Figure 3:
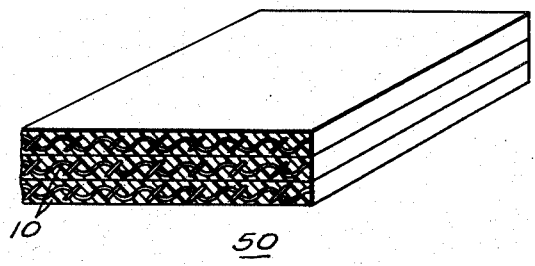
Fig. 3 is a view in perspective, partly in cross section, of a laminated member.

The heat treated glass fiber material of this invention is particularly suitable for the preparation of laminated members for high temperature use. Referring to Fig. 3 of the drawings, there is illustrated a laminated member 50 composed of a plurality of sheets 10 of glass cloth coated with phenyl methyl siloxane resin. A laminate similar to that shown in Fig. 3 was prepared by applying to phenyl methyl siloxane precoated seven mil thick glass cloth and heat treated to remove the organic lubricant sufficient of a solution of a phenyl methyl siloxane having an R to Si ratio of from 1 to 1.2 in an amount approximately equal to the weight of the glass cloth. The coated glass fiber cloth was dried by moderate heating in order to remove the solvent alone without curing the siloxane. The sheets of glass cloth with the solvent-free siloxane resin were superimposed and subjected to a pressure of 1000 pounds per square inch at a temperature of 200° C. for one hour. A laminated member of high bond strength was produced. Comparative tests for one-half inch thick laminates show that the bond strength of laminates produced from phenyl methyl siloxane and the heat treated glass cloth of this invention was approximately 1100 pounds. The bond strength of laminates employing glass cloth that was heat treated without a siloxane precoating, but otherwise identical with the former material, was only 700 pounds.

It will be apparent accordingly that the precoating of glass fiber materials with a phenyl methyl siloxane before heat treatment to drive off organic lubricant from the glass fiber material results in a great improvement in the characteristics of the composite material produced from the glass cloth and subsequently applied phenyl methyl siloxane resins.

A minor proportion of a compatible organo-silicon oxide may be present in the phenyl methyl siloxane. Phenyl ethyl siloxanes in small amounts, for instance, may be admixed therein. For most purposes, however, the phenyl methyl siloxanes alone are preferred. Catalysts such as cobalt naphthenate, lead resinate and the like may be added to expedite curing of the siloxane. Small amounts of mica dust, silica or other inorganic filler may be present in the siloxane to impart a desired viscosity.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. The process of treating a glass fiber material carrying an application of organic hydrocarbon-oxygen lubricant, comprising applying a coating of liquid phenyl methyl siloxane to the glass fiber material in an amount equal to from about 5% to 15% of the weight of glass fibers and heat treating the coated glass fiber material at a temperature of from about 300° C. to about 450° C. for a sufficient period of time to volatilize and carbonize the organic lubricant but not sufficient to deteriorate the phenyl methyl siloxane to any significant amount, the time being inversely proportional to the temperature, and the time being of the order of three minutes at a temperature of from 320° C. to 380° C.

2. The process of treating a glass fiber material carrying an application of organic hydrocarbon-oxygen lubricant, comprising applying a coating of liquid phenyl methyl siloxane to the glass fiber material in an amount equal to from about 5% to 15% of the weight of glass fibers, heat treating the coated glass fiber material at a temperature of from about 300° C. to about 450° C. for a sufficient period of time to volatilize and carbonize the organic lubricant but not sufficient to deteriorate the phenyl methyl siloxane to a significant amount, the time being inversely proportional to the temperature, and the time being of the order of three minutes at a temperature of from 320° C. to 380° C., applying an additional coating of a fluid polymerizable phenyl methyl siloxane and polymerizing the phenyl methyl siloxane to the solid state.

3. Sheet material comprising, in combination, a sheet of glass fibers, the glass fibers having been originally coated with an organic hydrocarbon-oxygen lubricant, subsequently coated with from 5% to 15% by weight of a liquid phenyl methyl siloxane and then heat treated to volatilize and carbonize the organic lubricant without materially deteriorating the applied siloxane, the time of heat treatment being inversely proportional to the temperature, the time being of the order of three minutes for a temperature of from 320° C. to 380° C., the heat treatment temperatures being from about 300° C. to 450° C.

4. Sheet material comprising, in combination, a sheet of glass fibers, the glass fibers having been originally coated with an organic hydrocarbon-oxygen lubricant, subsequently coated with from 5% to 15% by weight of a liquid phenyl methyl siloxane and then heat treated to volatilize and carbonize the organic lubricant, without materially deteriorating the applied siloxane the time of heat treatment being inversely proportional to the temperature, the time being of the order of three minutes for a temperature of from 320° C. to 380° C., the heat treatment temperatures being from about 300° C. to 450° C. and additional phenyl methyl siloxane resin in a polymerized condition applied to and impregnating the glass fibers, the resulting sheet material being smoother and having a substantially higher dielectric strength than the same material heat-treated without a coating of siloxane present with the lubricant.

5. A high bond strength laminate comprising, in combination, a plurality of sheets of glass fibers, the sheets of glass fibers derived by applying to glass fibers coated with an organic hydrocarbon-oxygen lubricant a coating of a liquid phenyl methyl siloxane in an amount equal to from 5% to 15% of the weight of the sheets, and heat treating the glass fibers so coated at a temperature of from 300° C. to 450° C. for a period of time sufficient to volatilize and carbonize the organic lubricant, the time being inversely proportional to the temperature, and the time being of the order of three minutes at a temperature of from 320° C. to 380° C., and additional amounts of a polymerized phenyl methyl siloxane applied to the sheets of glass fibers to impregnate and to bond them into the laminate.

CYRIL J. STRAKA.

REFERENCES CITED

The following references are of record in the file of this patent:

UNITED STATES PATENTS

| Number | Name | Date |
|---|---|---|
| 2,225,009 | Hyde | Dec. 17, 1940 |
| 2,258,218 | Rochow | Oct. 7, 1941 |
| 2,258,222 | Rochow | Oct. 7, 1941 |
| 2,386,466 | Hyde | Oct. 9, 1945 |
| 2,390,370 | Hyde | Dec. 4, 1945 |
| 2,392,805 | Biefeld | Jan. 15, 1946 |

OTHER REFERENCES

"Silicone Resin Bonded Laminates," article by Larsen et al. in "Modern Plastics," vol. 23, No. 7, published March 1946, pages 160–162, 192, 194.